(12) United States Patent
Hiramatsu

(10) Patent No.: US 8,007,399 B2
(45) Date of Patent: Aug. 30, 2011

(54) AUTOMATIC TRANSMISSION

(75) Inventor: Takeo Hiramatsu, Nagaokakyo (JP)

(73) Assignee: JATCO Ltd, Fuji-shi (JP)

( * ) Notice: Subject to any disclaimer, the term of this patent is extended or adjusted under 35 U.S.C. 154(b) by 356 days.

(21) Appl. No.: 12/271,121

(22) Filed: Nov. 14, 2008

(65) Prior Publication Data

US 2009/0143186 A1    Jun. 4, 2009

(30) Foreign Application Priority Data

Nov. 29, 2007 (JP) ................. 2007-309537

(51) Int. Cl.
*F16H 3/44* (2006.01)

(52) U.S. Cl. ........................................ 475/286

(58) Field of Classification Search ............ 475/269, 475/275, 323, 330
See application file for complete search history.

(56) References Cited

U.S. PATENT DOCUMENTS

| | | | |
|---|---|---|---|
| 6,623,397 B1 | 9/2003 | Raghavan et al. | |
| 6,648,791 B2 | 11/2003 | Kao et al. | |
| 6,991,577 B2 | 1/2006 | Usoro et al. | |
| 6,994,649 B2 | 2/2006 | Raghavan et al. | |
| 7,094,173 B2 * | 8/2006 | Raghavan et al. | 475/276 |
| 7,153,232 B2 * | 12/2006 | Usoro et al. | 475/296 |
| 7,300,378 B2 | 11/2007 | Raghavan et al. | |
| 7,833,123 B2 | 11/2010 | Hiramatsu | |
| 2005/0245345 A1 | 11/2005 | Bucknor et al. | |
| 2009/0143185 A1 | 6/2009 | Hiramatsu | |

FOREIGN PATENT DOCUMENTS

JP   2004-176765 A   6/2004

OTHER PUBLICATIONS

U.S. Appl. No. 12/271,115, filed Nov. 14, 2008, Hiramatsu.
U.S. Appl. No. 12/271,131, filed Nov. 14, 2008, Hiramatsu.
T. Hiramatsu, U.S. PTO Office Action, U.S. Appl. No. 12/271,115, dated Jan. 6, 2011, 10 pages.
T. Hiramatsu, U.S. PTO Office Action, U.S. Appl. No. 12/271,131, dated Jan. 28, 2011, 11 pages.
T. Hiramatsu, U.S. PTO Office Action, U.S. Appl. No. 12/271,115, dated May 2, 2011, 10 pages.
T. Hiramatsu, U.S. PTO Office Action, U.S. Appl. No. 12/271,131, dated May 4, 2011, 8 pages.

* cited by examiner

*Primary Examiner* — David D Le
*Assistant Examiner* — David J Hlavka
(74) *Attorney, Agent, or Firm* — Foley & Lardner LLP

(57) ABSTRACT

An automatic transmission includes a first planetary gear set; a second planetary gear set; a third planetary gear set; an input shaft; an output shaft; and five friction elements. A first ring gear is constantly locked. A third sun gear is connected with a first sun gear to define a first rotating member, and a second sun gear is connected with a first carrier to define a second rotating member. The input shaft is constantly connected with the first rotating member, and the output shaft is constantly connected with a third carrier. The five friction elements include a first friction element adapted to selectively connect a second ring gear with a third ring gear, a second friction element adapted to stop a rotation of a second carrier, a third friction element adapted to selectively connect the second carrier with the third ring gear, a fourth friction element adapted to selectively connect the second ring gear with the third carrier, and a fifth friction element adapted to selectively connect the first rotating member with the second carrier. Each of at least seven forward speed-ratios and one reverse speed-ratio is achieved by an engaged state of two friction elements selected from the five friction elements.

4 Claims, 3 Drawing Sheets

FIG.2

$\rho_1 = Z_{S1}/Z_{R1} = 0.5$   $\rho_2 = Z_{S2}/Z_{R2} = 0.65$   $\rho_3 = Z_{S3}/Z_{R3} = 0.55$

| GEAR | A | B | C | D | E | FORMULA OF REDUCTION GEAR RATIO $i = n_T/n_2$ | REDUCTION GEAR RATIO | 1/REDUCTION GEAR RATIO |
|---|---|---|---|---|---|---|---|---|
| FIRST SPEED | ○ | ○ | | | | $i_1 = (1+\rho_1)(1+\rho_3)/(\rho_3+\rho_1\rho_3-\rho_1\rho_2)$ | 4.650 | 0.215 |
| SECOND SPEED | | ○ | ○ | | | $i_2 = (1+\rho_3)/\rho_3$ | 2.818 | 0.355 |
| THIRD SPEED | ○ | | ○ | | | $i_3 = (1+\rho_1)(1+\rho_3)/(\rho_1(1+\rho_3)+\rho_3)$ | 1.755 | 0.570 |
| FOURTH SPEED | | | ○ | ○ | | $i_4 = (1+\rho_1)(\rho_2+\rho_3+\rho_2\rho_3)/(\rho_3(1+\rho_1)(1+\rho_2)+\rho_1\rho_2)$ | 1.385 | 0.722 |
| FIFTH SPEED | | | ○ | | ○ | $i_5 = 1$ | 1.000 | 1.000 |
| SIXTH SPEED | ○ | | | | ○ | $i_6 = (1+\rho_1)(1+\rho_3)/((1+\rho_1)(1+\rho_3)+\rho_2)$ | 0.782 | 1.279 |
| SEVENTH SPEED | | | | ○ | ○ | $i_7 = (1+\rho_1)/(1+\rho_1+\rho_2)$ | 0.698 | 1.433 |
| REVERSE | | ○ | | ○ | | $i_R = -(1+\rho_3)/(\rho_2\rho_3)$ | -4.615 | -0.217 |

RATIO COVERAGE : 6.66   (R/1) = 0.99

FIG.3

| | REDUCTION GEAR RATIO | 1/REDUCTION GEAR RATIO (NORMALIZED BY HIGHEST SPEED) | DIFFERENCE BETWEEN ADJACENT SPEEDS |
|---|---|---|---|
| FIRST SPEED | 4.650 | 0.150 | 0.150 |
| SECOND SPEED | 2.818 | 0.248 | 0.097 |
| THIRD SPEED | 1.755 | 0.398 | 0.151 |
| FOURTH SPEED | 1.385 | 0.504 | 0.106 |
| FIFTH SPEED | 1.000 | 0.698 | 0.194 |
| SIXTH SPEED | 0.782 | 0.893 | 0.195 |
| SEVENTH SPEED | 0.698 | 1.000 | 0.107 |

| STANDARD DEVIATION | 0.041 |
|---|---|

AUTOMATIC TRANSMISSION

BACKGROUND OF THE INVENTION

The present invention relates to a step automatic transmission employed as a transmission for vehicle.

Japanese Patent Application Publication No. 2004-176765 or U.S. Pat. No. 6,648,791 (FIGS. 23 to 26) discloses an automatic transmission adapted to achieve forward seven speed-ratios by using three planetary gear sets. In the automatic transmission disclosed in the above Japanese Patent Application, the forward seven speed-ratios are obtained by using six friction elements and three single-pinion-type planetary gear sets. This single-pinion-type planetary gear set has an advantage in transfer efficiency and gear noise and also an advantage in durability because of the nonnecessity for reducing a diameter of pinion gear. Moreover similarly, the automatic transmission disclosed in the above United States patent achieves forward six speed-ratios to forward eight speed-ratios by using five friction elements and three single-pinion-type planetary gear sets.

SUMMARY OF THE INVENTION

However, in the technique disclosed in the above Japanese Patent Application, at least six friction elements are necessary to achieve the seven forward speed-ratios. Therefore, there is a problem that the number of friction elements is large so that an increase of the number of components and an increase in axial length are incurred.

Since the number of friction elements provided for achieving the forward seven speed-ratios is five in the technique of the above United States patent, there is an advantage that the number of friction elements is small as compared with that of the above Japanese Patent Application, so that the number of components can be reduced. However, in the automatic transmissions shown in FIGS. 23 and 24 of the above United States patent, there is a problem that a fuel economy worsens because of a lot of connecting members passing on a radially outer side of the planetary gear sets. For example, regarding FIG. 23, members passing on the radially outer side of a ring gear of center one of three planetary gear sets form a three-layered structure. Generally, in the automatic transmission, lubricating oil is released from a shaft-center side by means of centrifugal force and then is collected into an oil pan provided in a lower portion of the automatic transmission via respective parts requiring to be lubricated. In the case that the connecting members such as a drum member are provided in a multilayer structure on the radially outer side of planetary gear set, the lubricating oil is easy to be retained inside the above-mentioned members. Since many of these members rotate at the time of vehicle running, there is a problem that respective frictions are increased to worsen the fuel economy.

On the other hand, in the technique shown in FIG. 25 of the above United States patent, members passing on the radially outer side of planetary gear set are provided in a two-layered form. Hence, lubricating oil is resistant to the retention (a disrupted flow) as compared to the technique of FIG. 23. However, a multi-shaft structure, concretely three-layered structure at a maximum is formed on a radially inner side of a sun gear of input-shaft-side one of three planetary gear sets. Hence, dimensions of the sun gear are restricted so that there is a problem that a degree of freedom to design a gear ratio of the input-shaft-side planetary gear set is low. In the case of trying to secure a sufficient value of gear ratio of planetary gear set in this technique, another problem is caused that dimensions of the planetary gear set are upsized so as to upsize the outside dimensions of automatic transmission.

It is an object of the present invention to provide an automatic transmission that is capable of achieving seven forward speed-ratios by means of three simple planetary gear sets and five friction elements, and that is devised to reduce members passing on the radially outer side of planetary gear set and/or devised to reduce the number of shafts passing on the radially inner side of planetary gear set.

According to one aspect of the present invention, there is provided an automatic transmission comprising: a first planetary gear set including a first sun gear, a first pinion engaged with the first sun gear, a first carrier supporting the first pinion, and a first ring gear engaged with the first pinion and constantly locked; a second planetary gear set including a second sun gear connected with the first carrier to define a second rotating member, a second pinion engaged with the second sun gear, a second carrier supporting the second pinion, and a second ring gear engaged with the second pinion; a third planetary gear set including a third sun gear connected with the first sun gear to define a first rotating member, a third pinion engaged with the third sun gear, a third carrier supporting the third pinion, and a third ring gear engaged with the third pinion; an input shaft constantly connected with the first rotating member; an output shaft constantly connected with the third carrier; and five friction elements including a first friction element adapted to selectively connect the second ring gear with the third ring gear, a second friction element adapted to stop a rotation of the second carrier, a third friction element adapted to selectively connect the second carrier with the third ring gear, a fourth friction element adapted to selectively connect the second ring gear with the third carrier, and a fifth friction element adapted to selectively connect the first rotating member with the second carrier, the automatic transmission being adapted to achieve at least seven forward speed-ratios and one reverse speed-ratio, each of the at least seven forward speed-ratios and one reverse speed-ratio being achieved by an engaged state of two friction elements selected from the five friction elements.

The other objects and features of this invention will become understood from the following description with reference to the accompanying drawings.

BRIEF DESCRIPTION OF THE DRAWINGS

FIG. 2 is a diagram showing a concrete example of an engagement table of friction elements and reduction gear ratios in the automatic transmission according to the first embodiment.

FIG. 3 is a view showing differences between respective first to seventh speeds according to the first embodiment.

DETAILED DESCRIPTION OF THE INVENTION

Figure 1:
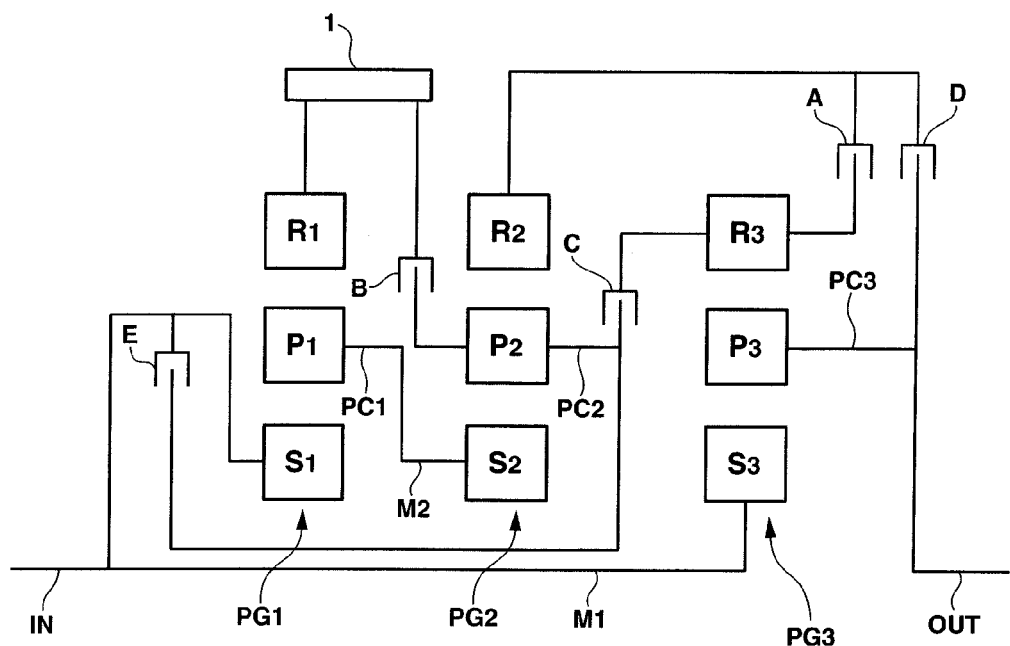
FIG. 1 is a skeleton diagram showing an automatic transmission according to a first embodiment of the present invention.

Reference will hereinafter be made to the drawings in order to facilitate a better understanding of the present invention.

First Embodiment

At first, structures of a shift mechanism of a step automatic transmission according to a first embodiment of the present invention will now be explained. FIG. 1 is a skeleton diagram showing the shift mechanism of the step (multiple-step type) automatic transmission according to the first embodiment.

FIG. 2 is a diagram showing a concrete example of a table regarding engagements of friction elements and reduction gear ratios (speed reducing ratios) in the automatic transmission according to the first embodiment.

The automatic transmission according to the first embodiment includes a first planetary gear set PG1, a second planetary gear set PG2 and a third planetary gear set PG3, as a gear train, as shown in FIG. 1. Each of the three planetary gear sets PG1, PG2 and PG3 is of single-pinion type. First planetary gear set PG1 includes a first sun gear S1, a first ring gear R1, and a first pinion P1 engaged or meshed with first sun gear S1 and first ring gear R1. Second planetary gear set PG2 includes a second sun gear S2, a second ring gear R2, and a second pinion P2 engaged with second sun gear S2 and second ring gear R2. Third planetary gear set PG3 includes a third sun gear S3, a third ring gear R3, and a third pinion P3 engaged with third sun gear S3 and third ring gear R3. First, second and third pinions P1 to P3 are supported rotatably relative to a first carrier PC1, a second carrier PC2 and a third carrier PC3, respectively. Namely, each carrier PC1, PC2 or PC3 pivotally supports the corresponding pinion P1, P2 or P3. First planetary gear set PG1 is disposed on the side of an input shaft IN, and third planetary gear set PG3 is disposed on the side of an output shaft OUT. Second planetary gear set PG2 is disposed between first planetary gear set PG1 and third planetary gear set PG3.

First sun gear S1 is always connected (engaged) with third sun gear S3 (i.e., constantly rotates together with third sun gear S3) to form a first rotating member M1. First carrier PC1 is always connected with second sun gear S2 to form a second rotating member M2. First ring gear R1 is always locked relative to a transmission case 1 (i.e., constantly fastened to transmission case 1). Input shaft IN is always connected with first rotating member M1. Output shaft OUT is always connected with third carrier PC3.

The automatic transmission further includes one brake, i.e., a second friction element B; and four clutches, i.e., first, third, fourth and fifth friction elements A, C, D and E. The first friction element A is provided between second ring gear R2 and third ring gear R3, and is adapted to selectively connect (engage) second ring gear R2 with third ring gear R3. The second friction element B is provided between second carrier PC2 and transmission case 1, and is adapted to selectively lock (stop) a rotation of second carrier PC2 relative to transmission case 1 (i.e., selectively fasten second carrier PC2 to the transmission case). The third friction element C is provided between second carrier PC2 and third ring gear R3, and is adapted to selectively connect second carrier PC2 with third ring gear R3. The fourth friction element D is provided between second ring gear R2 and third carrier PC3, and is adapted to selectively connect second ring gear R2 with third carrier PC3. The fifth friction element E is provided between first sun gear S1 and second carrier PC2, and is adapted to selectively connect first rotating member M1 with second carrier PC2.

Output shaft OUT is provided with an output gear or the like to transmit rotational driving force through a differential gear and a drive shaft to a drive wheel, which are not shown. In the case of the first embodiment, since output shaft OUT is not obstructed by the other member or the like, the automatic transmission is applicable to both of a front-wheel drive vehicle and a rear-wheel drive vehicle.

The relations in engagements (connections) of the friction elements under respective speed-ratios (i.e., respective steps for shift) will be explained below referring to the engagement table of FIG. 2 (these engagements for respective speed-ratios are attained by a shift control section or means). In the table of FIG. 2, the sign ◯ represents the engagement (engaged state), and the blank represents the disengagement (released state).

At first, the states at the time of forward running will now be explained. A first-speed (first speed-ratio) is achieved by engaging first friction element A and second friction element B. A second-speed is achieved by engaging second friction element B and third friction element C. A third-speed is achieved by engaging first friction element A and third friction element C. A fourth-speed is achieved by engaging third friction element C and fourth friction element D. A fifth-speed is achieved by engaging third friction element C and fifth friction element E. A sixth-speed is achieved by engaging first friction element A and fifth friction element E. A seventh-speed is achieved by engaging fourth friction element D and fifth friction element E. Next, the state at the time of reverse running is now explained. A reverse-speed is achieved by engaging second friction element B and fourth friction element D.

Next, a concrete example of the reduction gear ratios according to the first embodiment will now be explained referring to FIG. 2. The following explanations are given in the case where a gear ratio $\rho1=ZS1/ZR1$ of first planetary gear set PG1 is equal to 0.50 (i.e., $\rho1=ZS1/ZR1=0.50$), a gear ratio $\rho2=ZS2/ZR2$ of second planetary gear set PG2 is equal to 0.65 (i.e., $\rho2=ZS2/ZR2=0.65$), and a gear ratio $\rho3=ZS3/ZR3$ of third planetary gear set PG3 is equal to 0.55 (i.e., $\rho3=ZS3/ZR3=0.55$). Where, each of ZS1, ZS2, ZS3, ZR1, ZR2 and ZR3 represents the number of teeth of the corresponding gear.

A reduction gear ratio i1 of the first-speed in the forward running is expressed by a formula: $i1=(1+\rho1)(1+\rho3)/(\rho3+\rho1\rho3-\rho1\rho2)$. By assigning the concrete numerical values to this formula, reduction gear ratio i1 of the forward first-speed is calculated as i1=4.650. The inverse of reduction gear ratio i1 is equal to 0.215.

A reduction gear ratio i2 of the second-speed in the forward running is expressed by a formula: $i2=(1+\rho3)/\rho3$. By assigning the concrete numerical values to this formula, reduction gear ratio i2 of the forward second-speed is calculated as i2=2.818. The inverse of reduction gear ratio i2 is equal to 0.355.

A reduction gear ratio i3 of the third-speed in the forward running is expressed by a formula: $i3=(1+\rho1)(1+\rho3)/(\rho1(1+\Sigma3)+\Sigma3)$. By assigning the concrete numerical values to this formula, reduction gear ratio i3 of the forward third-speed is calculated as i3=1.755. The inverse of reduction gear ratio i3 is equal to 0.570.

A reduction gear ratio i4 of the fourth-speed in the forward running is expressed by a formula: $i4=(1+\rho1)(\rho2+\rho3+\rho2\rho3)/(\rho3(1+\rho1)(1+\rho2)+\rho1\rho2)$. By assigning the concrete numerical values to this formula, reduction gear ratio i4 of the forward fourth-speed is calculated as i4=1.385. The inverse of reduction gear ratio i4 is equal to 0.722.

A reduction gear ratio i5 of the fifth-speed in the forward running is expressed by a formula: i5=1.0. Without assigning the concrete numerical values to this formula, reduction gear ratio i5 of the forward fifth-speed is equal to 1.000. The inverse of reduction gear ratio i5 is equal to 1.000.

A reduction gear ratio i6 of the sixth-speed in the forward running is expressed by a formula: $i6=(1+\rho1)(1+\rho3)/((1+\rho1)(1+\rho3)+\rho2)$. By assigning the concrete numerical values to this formula, reduction gear ratio i6 of the forward sixth-speed is calculated as i6=0.782. The inverse of reduction gear ratio i6 is equal to 1.279.

A reduction gear ratio i7 of the seventh-speed in the forward running is expressed by a formula: $i7=(1+\rho1)/(1+\rho1+$ ρ2). By assigning the concrete numerical values to this formula, reduction gear ratio i7 of the forward seventh-speed is calculated as i7=0.698. The inverse of reduction gear ratio i7 is equal to 1.433.

A reduction gear ratio iR of the reverse-speed is expressed by a formula: $iR=-(1+\rho3)/(\rho2\rho3)$. By assigning the concrete numerical values to this formula, reduction gear ratio iR of the reverse-speed is calculated as iR=−4.615. The inverse of reduction gear ratio iR is equal to −0.217.

Next, a characteristic of the respective reduction gear ratios in the first embodiment is explained referring to FIG. 3. FIG. 3 is a table showing interrelations among the respective speed-ratios obtained by the automatic transmission in the first embodiment. It is proper that a ratio between speed-ratios (i.e., relation among respective speed-ratios, also called a step ratio) is evaluated based on how close a so-called V1000 is to arithmetic series (arithmetic progression). This V1000 is comparable to a vehicle-speed range which each speed-ratio is in charge of (a vehicle-speed range which each step for shift covers). That is, in the case where the V1000 is allocated in a manner of arithmetic series, each of the in-charge vehicle-speed ranges in respective speed-ratios has an equivalent width to one another. In this case, particularly; upshifts become rhythmical, and a selection of speed-ratio on a downhill or uphill road is conducted with no difficulty, so that the automatic transmission having a superior drivability can be achieved.

In order to quantitatively determine how the V1000 has deviated or departed from the arithmetic series, the following procedure is used. That is, the inverses of reduction gear ratio values under the respective speed-ratios are normalized by regarding the inverse of reduction gear ratio value under the highest-step speed-ratio (i.e., seventh speed) as a value equal to 1, and then a deviation degree (amount) of these normalized values from the arithmetic series is quantitatively calculated. In the automatic transmission according to the first embodiment, a standard deviation calculated is equal to 0.041 which is recognized as an extremely small value.

Effects According to the First Embodiment

① Effects by Virtue of Structural Skeleton as a Whole

In the first embodiment, the automatic transmission capable of attaining the seven speeds of forward running and the one speed of reverse running can be realized with proper reduction gear ratio values being ensured; although the automatic transmission is constructed by a limited number of simple constructional elements, namely, the three sets of simple planet gears (three single-pinion-type planetary gear sets) and the five friction elements.

② Effects by Virtue of the Usage of Three Simple Planetary Gear Sets

Because of the usage of the three sets of simple planet gears (the usage of three single-pinion-type planetary gear sets), a gear noise and a transfer efficiency can be improved as compared to the case where double pinions (double-pinion-type planetary gear set) are used. Further, because a diameter of the pinion does not need to be reduced in this embodiment, a gear durability can be enhanced.

③ Effects Based on Ratio Coverage in the Forward Running

A ratio coverage (gear-ratio width) of the forward running is defined by dividing the reduction gear ratio of the lowest-speed (step) by the reduction gear ratio of the highest-speed (step), i.e., the reduction gear ratio of the lowest-speed/the reduction gear ratio of the highest-speed. It can be described that a compatibility between an accelerating performance at the time of vehicle start and a fuel economy at the time of high speed cruise of vehicle becomes better, and also a degree of freedom to set the gear ratio values in respective forward speed-ratios becomes higher; as the value of ratio coverage becomes greater. As concrete numerical values in the first embodiment, the reduction gear ratio of the forward first-speed is equal to 4.650 and the reduction gear ratio of the forward seventh-speed is equal to 0.698. In this embodiment, the ratio coverage from first-speed to seventh-speed is equal to 6.66, and hence a sufficient ratio coverage can be ensured. Therefore, for example, the automatic transmission according to the first embodiment is useful also as a transmission for a vehicle equipped with a diesel engine as its power source, although a width of rotational speed (number of revolutions) of diesel engine is narrower than that of gasoline engine and a torque of diesel engine is higher than that of a gasoline engine having the same engine displacement.

Moreover, in the case where the gear ratio value of the low-speed side is great relative to the ratio coverage, a torque transmitted to a final gear becomes relatively great. Hence, this case requires a sufficient strength of the automatic transmission or propeller shaft, so that the whole of vehicle body is upsized. That is, it is preferable that the gear ratio value (value of speed ratio) of the lowest-speed is not so great under the same condition of ratio coverage. In an automatic transmission shown by FIG. 23 in the document of U.S. Pat. No. 6,648,791, a gear ratio of the highest-speed (highest step for shift) is equal to 1. Hence in this technique, when trying to enlarge the ratio coverage, a gear ratio (value) of the lowest-speed (lowest step for shift) needs to be enlarged, so that the upsizing of the automatic transmission and the propeller shaft is caused. On the other hand, in the automatic transmission according to the first embodiment of the present invention, a sufficient ratio coverage can be ensured without the necessity of enlarging the gear ratio of the lowest-speed so much.

④ Effects Based on 1-R Ratio

A value of 1-R ratio (Reverse-speed/First-speed) is a value near 1, concretely, equal to 0.99. Accordingly, an acceleration feel of vehicle relative to a depressing adjustment of accelerator pedal does not greatly vary between at the time of forward running and at the time of reverse running. Therefore, the problem that the drivability worsens can be avoided.

⑤ Effects Based on Standard Deviation Related to the V1000

Since the standard deviation can be made an extremely small value (for example, 0.041 in this embodiment), the widths of the vehicle-speed ranges in the respective speed-ratios (the respective steps for shift) are equivalent to one another. Accordingly, particularly, the upshift attains a rhythmical shift, and the selection of reduction gear ratio is conducted with no difficulty on a downhill or uphill road, so that the automatic transmission having a superior drivability can be provided.

⑥ Effects Based on the Number of Changeovers Among the Friction Elements at the Time of Shift If one or more friction element is released and two or more friction elements are engaged at the time of shift, or if two or more friction elements are released and one or more friction element is engaged at the time of shift; a torque control and a control for the engaging and releasing timings of friction elements become complicated. Hence, from a viewpoint of avoidance of the complication of shift control, it is favorable that one friction element is released and another friction element is engaged at the time of shift. That is, it is favorable that a so-called double-changeover is avoided. In the first embodiment, the shifts between the forward first-speed and the forward second-speed are performed under the condition where second friction element B is maintained in engaged state. The shifts among the forward second-speed to the forward fifth-speed are performed under the condition where third friction element C is maintained in engaged state. Moreover, the shifts among the forward fifth-speed to the forward seventh-speed are performed under the condition where fifth friction element E is maintained in engaged state. Namely, each shift between adjacent two speed-ratios (gear steps) among the forward first-speed to seventh-speed can be achieved by releasing one friction element and by engaging one friction element. Accordingly, each of all the shifts between adjacent two speed-ratios of forward running is performed by means of only the changeover from one friction element to the other one friction element. Therefore, the control during the shift can be prevented from being complicated.

(7) Effects Based on Layout (i) In the automatic transmission according to the first embodiment, on a radially outer side of the three planetary gear sets, connecting members are disposed so as not to become in a three-layered form, as shown in the skeleton diagram of FIG. 1. That is, the number of the connecting members radially covered or overlapped with each other radially outside each planetary gear set is smaller than three. Accordingly, it becomes difficult to cause the retention of a lubricating oil (disrupted flow of lubricating oil), so that the fuel economy can be improved by reducing the frictions.

(ii) Moreover, the rotating member passing on the outer peripheral side of the planetary gear sets is formed in a single-layered structure, as shown by the skeleton diagram of FIG. 1. Generally in the automatic transmission, lubricating oil is always supplied to respective rotating elements such as gears and bearings (not shown) for the purpose of cooling, lubrication and the like. This lubricating oil is generally supplied from a shaft-center side of the transmission by means of centrifugal force. At this time, if an efficiency of discharge (retrieving performance) of lubricating oil becomes worsened on the outer peripheral side of the planetary gear sets, oil temperature rises so that a durability of friction elements, bearings and the like is reduced. The rotating member passing on the outer peripheral side of the planetary gear sets forms the single-layered structure in the first embodiment as mentioned above, and particularly, no rotating member is disposed at the outer peripheral of first planetary gear set PG1. Accordingly, the discharging efficiency of lubricating oil is not worsened so that the temperature rise is suppressed to improve the durability.

(iii) Members passing on a radially inner side of the three planetary gear sets are provided in a double-shaft structure at a maximum. That is, the number of members (shafts) passing through a radially inside space (of the sun gear) of each planetary gear set is smaller than or equal to 2. Accordingly, dimensions (size) of each sun gear are not restricted as compared with the technique disclosed in the document of U.S. Pat. No. 6,648,791, and a degree of freedom to design the ratio between teeth numbers in each planetary gear set is high so that a degree of freedom to design the automatic transmission can be enhanced.

(iv) The automatic transmission according to the first embodiment can be designed to allow torque to be inputted to one side of the planetary gear sets and then to be outputted from another side of the planetary gear sets. Accordingly, the automatic transmission according to the first embodiment is applicable to both of a front-wheel drive vehicle and a rear-wheel drive vehicle, namely can be widely applied.

(7) Effects From a Viewpoint of the Number of Friction Elements

The number of friction elements in the first embodiment is five, and these friction elements include one brake as second friction element B. Since the brake is provided as one of the five friction elements; the increase of the number of seals for rotation and the increase of centrifugal canceling mechanisms can be suppressed as compared with the case where the number of clutches is great. Thereby, the increase of the number of components and the increase in axial length can be suppressed while enhancing the fuel economy.

This application is based on a prior Japanese Patent Application No. 2007-309537 filed on Nov. 29, 2007. The entire contents of this Japanese Patent Application are hereby incorporated by reference.

Although the invention has been described above with reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An automatic transmission comprising:
   a first planetary gear set including
      a first sun gear,
      a first pinion engaged with the first sun gear,
      a first carrier supporting the first pinion, and
      a first ring gear engaged with the first pinion and constantly locked;
   a second planetary gear set including
      a second sun gear connected with the first carrier to define a second rotating member,
      a second pinion engaged with the second sun gear,
      a second carrier supporting the second pinion, and
      a second ring gear engaged with the second pinion;
   a third planetary gear set including
      a third sun gear connected with the first sun gear to define a first rotating member,
      a third pinion engaged with the third sun gear,
      a third carrier supporting the third pinion, and
      a third ring gear engaged with the third pinion;
   an input shaft constantly connected with the first rotating member;
   an output shaft constantly connected with the third carrier; and
   five friction elements including
      a first friction element adapted to selectively connect the second ring gear with the third ring gear,
      a second friction element adapted to stop a rotation of the second carrier,
      a third friction element adapted to selectively connect the second carrier with the third ring gear,
      a fourth friction element adapted to selectively connect the second ring gear with the third carrier, and
      a fifth friction element adapted to selectively connect the first rotating member with the second carrier,
   wherein the automatic transmission is adapted to achieve at least seven forward speed-ratios and one reverse speed-ratio,
   wherein the seven forward speed-ratios and one reverse speed-ratio are achieved by eight different patterns of engaged states of two friction elements selected from the five friction elements.

2. An automatic transmission comprising:
   a first planetary gear set including
      a first sun gear,
      a first pinion engaged with the first sun gear,
      a first carrier supporting the first pinion, and a first ring gear engaged with the first pinion and constantly locked;
a second planetary gear set including
   a second sun gear connected with the first carrier to define a second rotating member,
   a second pinion engaged with the second sun gear,
   a second carrier supporting the second pinion, and
   a second ring gear engaged with the second pinion;
a third planetary gear set including
   a third sun gear connected with the first sun gear to define a first rotating member,
   a third pinion engaged with the third sun gear,
   a third carrier supporting the third pinion, and
   a third ring gear engaged with the third pinion;
an input shaft constantly connected with the first rotating member;
an output shaft constantly connected with the third carrier; and
five friction elements including
   a first friction element adapted to selectively connect the second ring gear with the third ring gear,
   a second friction element adapted to stop a rotation of the second carrier,
   a third friction element adapted to selectively connect the second carrier with the third ring gear,
   a fourth friction element adapted to selectively connect the second ring gear with the third carrier, and
   a fifth friction element adapted to selectively connect the first rotating member with the second carrier,
the automatic transmission being adapted to achieve at least seven forward speed-rations and one reverse speed-ratio, each of the at least seven forward speed-rations and one reverse speed-ratio being achieved by an engaged state of two friction elements selected from the five friction elements,
   wherein the seven forward speed-ratios are achieved by concurrent engagements of the first friction element and the second friction element, concurrent engagements of the second friction element and the third friction element, concurrent engagements of the first friction element and the third friction element, concurrent engagements of the third friction element and the fourth friction element, concurrent engagements of the third friction element and the fifth friction element, concurrent engagements of the first friction element and the fifth friction element, and concurrent engagements of the fourth friction element and the fifth friction element.

3. The automatic transmission as claimed in claim 1, wherein
   each of all the shifts between adjacent two speed-ratios among the at least seven forward speed-ratios is performed by releasing one friction element of the at least five friction elements and by engaging the other one friction element of the at least five friction elements.

4. The automatic transmission as claimed in claim 2, wherein
   the one reverse speed-ratio is achieved by concurrent engagements of the second friction element and the fourth friction element.

* * * * *